United States Patent [19]
Teng

[11] Patent Number: 5,533,298
[45] Date of Patent: Jul. 9, 1996

[54] PORTABLE ELECTRONIC INSECT-KILLING DEVICE

[76] Inventor: Hsi-Hsiung Teng, No. 115-3, Chien Kuo I Rd., Kaohsiung, Taiwan

[21] Appl. No.: 296,034

[22] Filed: Aug. 25, 1994

[51] Int. Cl.⁶ ................................................. A01M 1/22
[52] U.S. Cl. ................................................ 43/112; 43/137
[58] Field of Search ........................................ 43/112, 137

[56] References Cited

U.S. PATENT DOCUMENTS

| | | | |
|---|---|---|---|
| 841,905 | 1/1907 | Sullivan | 43/112 |
| 974,785 | 11/1910 | Frost | 43/112 |
| 1,910,623 | 5/1933 | Williams | 43/112 |
| 2,881,554 | 4/1959 | Laine | 43/112 |
| 3,971,292 | 7/1976 | Paniagua | 43/112 |
| 4,962,611 | 10/1990 | Millard | 43/112 |

FOREIGN PATENT DOCUMENTS

| | | | |
|---|---|---|---|
| 0358852 | 5/1938 | Italy | 43/112 |

*Primary Examiner*—Jack W. Lavinder
*Assistant Examiner*—James Miner
*Attorney, Agent, or Firm*—Kirkpatrick & Lockhart

[57] ABSTRACT

A portable electronic insect-killing device for killing insects has a handle, a support frame, and a tube connected therebetween. A first set of exposed conductive lines and a second set of exposed conductive lines are alternately, line by line, disposed across the support frame. A relatively high voltage source is disposed inside the handle for providing a relatively high positive voltage and a negative voltage which are respectively coupled to the first exposed lines and the second exposed lines via a positive line and a negative line, such that the first and second exposed lines together constitute an electronic net for killing insects upon contact. The first exposed lines each have a first end independently connected to an upper edge of the frame and a second end connected to a lower edge of the frame, while the second ends of the first exposed lines are electronically connected via the positive line. The second exposed lines each have a first end independently connected to the upper edge of the frame and a second end connected to the lower edge of the frame, while the second ends of the second exposed lines are electronically connected via the negative line.

4 Claims, 3 Drawing Sheets

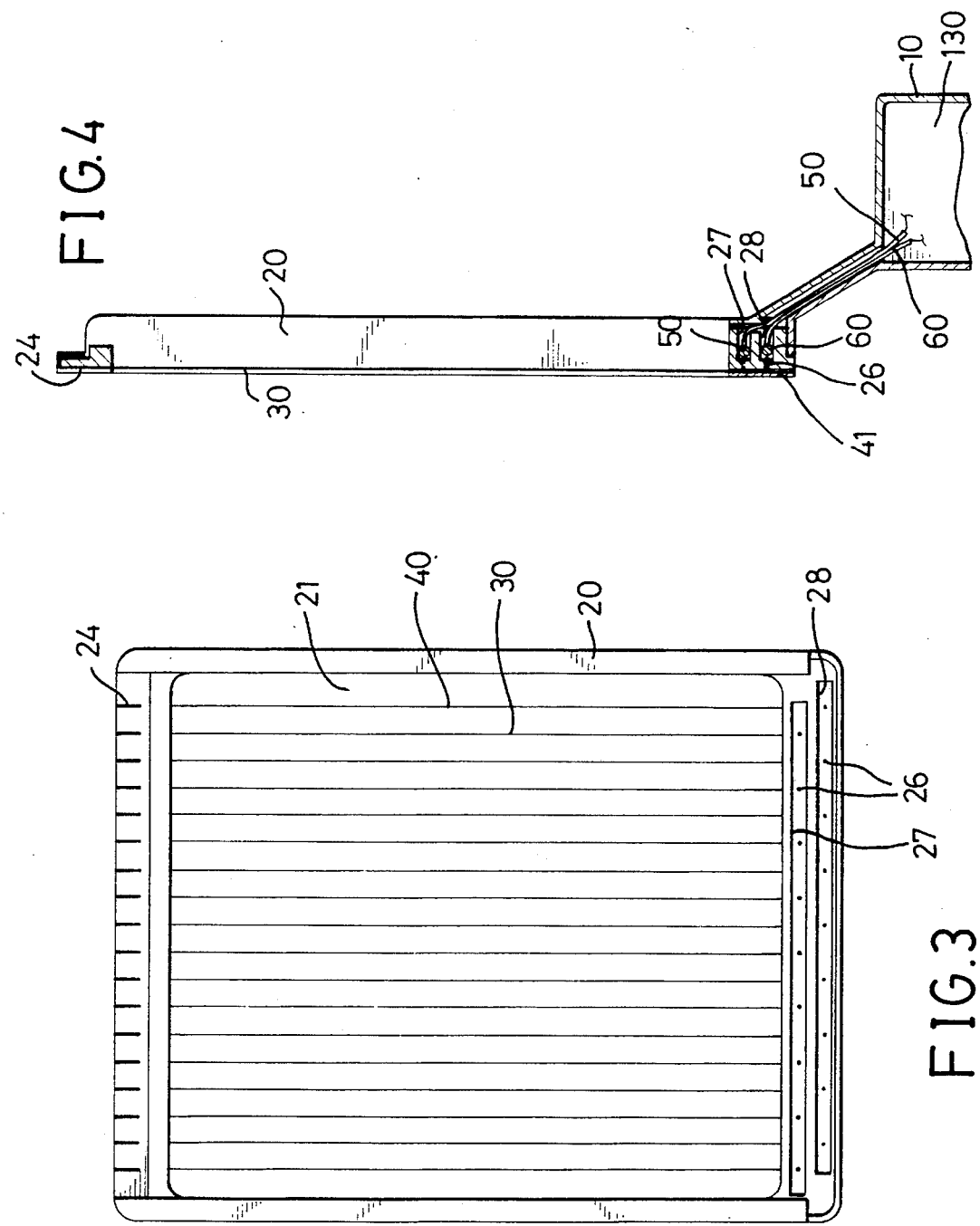

PORTABLE ELECTRONIC INSECT-KILLING DEVICE

BACKGROUND OF THE INVENTION

This invention relates to an electronic insect killing device, particularly to such a device which is portable and manually operated.

A conventional fly swatter for insect killing causes a lot of trouble because the user has to be skillful enough to hit the insect before it flies away. Also, the dead body of the insect becomes messy and contaminates the environment. In an outdoor environment, mosquitoes usually fly around and are not easily killed by a conventional fly swatter.

For killing the mosquitoes, a U.S. Pat. No. 2,881,554 discloses a fly swatter comprising a swatting element having a swatting surface on one side thereof comprising a wire screen of a mesh sufficiently large to allow a fly, when hit thereby, to be forced therethrough; and, on the other side of said element, a wire screen of a mesh small enough to intercept a fly passing through said first mentioned screen; said screens being parallel to and insulated from each other but so closely spaced that a fly between said screens will have a part in contact with each; a handle for said element; and means in said handle, electronically connected to said screens as terminals, for producing electricity at a voltage sufficiently high to kill a fly when in contact with both screens. Although the 2,881,554 patent can kill a mosquito when it flies into between the two screens, it results in some practical problems to be solved. Firstly, the mesh screen, especially each intersection point, blocks the insects to pass therethrough. For example, a fly when hit near any mesh intersection point, is definitely blocked out of the screen, thus it is difficult to coincidentally force the fly to pass the mesh screen when in use. Secondly, when a fly is killed between the two mesh screens, the body of the fly will be retained in between the two mesh screens and it performs as a capacitor to be charged by the voltage drop between the two mesh screens. Therefore, in practical use, if a fly is caught between the meshes, the fly swatter can not kill another incoming fly until the caught fly has been charged to be a dry body or removed. Thirdly, the mesh screens require to be woven with very high tension preventing the front screen and the rear screen to contact to each other and causing short-circuit. Fourthly, the mesh screens requires much time and effort to weave, therefore the manufacture thereof costs expensively. Fifthly, the fly swatter can only kill flies not for other insects and the flies have to be coincidentally fly between the two screens. Sixthly, the fly swatter can only kill flying flies not for other insects which fly or crawl such as attactable bees, mothes, cockroaches, ants, spiders, and so on. It is understandable that the mesh structure of Pat. No. 2,881,554 is not an efficient device for the reasons described above.

In U.S. Pat. No. 1,966,999, an apparatus for electrocuting insects is disclosed. This apparatus comprises a frame provided with a pair of spaced channel members, a plurality of insulating members, each insulating member having a body portion, an outwardly and rearwardly extending base portion in supported engagement with a channel member, and an outwardly extending flange having teeth formed by alternate deep notches and shallow notches therein, said body portion having parallel grooves in the outer face thereof in line with said notches, said base portion and flange being in spaced relation and extending substantially in parallel from the same side of the body portion, and wires extending from the teeth of an insulating member supported in one channel member to the teeth of an insulating member supported in the other channel member with alternate wires connected in pairs by offset portions lying in a common plane, said connected pairs of wires arranged alternately in deep notches and shallow notches between the teeth so as to be in insulated, interleaved relation. U.S. Pat. No. 1,966,999 uses parallel wires replacing mesh screens. However, U.S. Pat. No. 1,966,999 cannot avoid uselessness when any wire is broken. Since the wires in U.S. Pat. No. 1,966,999 are separated into two wires connected to any suitable source of high tension current, any one of them is broken resulting in a dangling portion which is apt to be short circuited with adjacent wires thus damaging the apparatus. Moreover, each of the two wires is woven through the frame with very high tension, therefore the woven parallel pattern of the wire will be damaged and lose its effect due to any broken portion of each wire. Another drawback of the U.S. Pat. No. 1,966,999 is that this apparatus is mounted in a door, or the equivalent, therefore it is not portable.

It is requisite to provide an improved structure which still works even when any portion of the exposed wire is broken.

SUMMARY OF THE INVENTION

It is an object of the present invention to provide an electronic insect-killing device which is portable and manually operated to more effectively kill insects, particularly flying insects.

It is another object of the present invention to provide an electronic insect-killing device which is able to kill an insect without disintegrating the insect and causing messy.

It is yet another object of the present invention to provide an electronic insect-killing device which is able to keep working even when a portion of the net is broken.

It is one aspect to provide a portable electronic insect-killing device for killing insects comprising a handle, a support frame, and a tube connected therebetween. A first set of exposed conductive lines and a second set of exposed conductive lines are alternately, line by line, disposed across the support frame. A relatively high voltage source is disposed inside the handle for providing a relatively high positive voltage and a negative voltage which are respectively coupled to the first exposed lines and the second exposed lines via a positive line and a negative line, such that the first and second exposed lines together constitute an electronic net for killing insects upon contact. The first exposed lines each have a first end independently connected to an upper edge of the frame and a second end connected to a lower edge of the frame, while the second ends of the first exposed lines are electronically connected via the positive line. The second exposed lines each have a first end independently connected to the upper edge of the frame and a second end connected to the lower edge of the frame, while the second ends of the second exposed lines are electronically connected via the negative line.

These and additional objects, if not set forth specifically herein, will be readily apparent to those skilled in the art from the detailed description provided hereunder, with appropriate reference to the accompanying drawings.

BRIEF DESCRIPTION OF THE DRAWINGS

FIG. 3 is a rear view of the frame portion in FIG. 2; and

FIG. 4 is cross-sectional view of the portable electronic insect-killing device in accordance with the present invention.

DETAILED DESCRIPTION OF THE PREFERRED EMBODIMENTS

Figure 1:
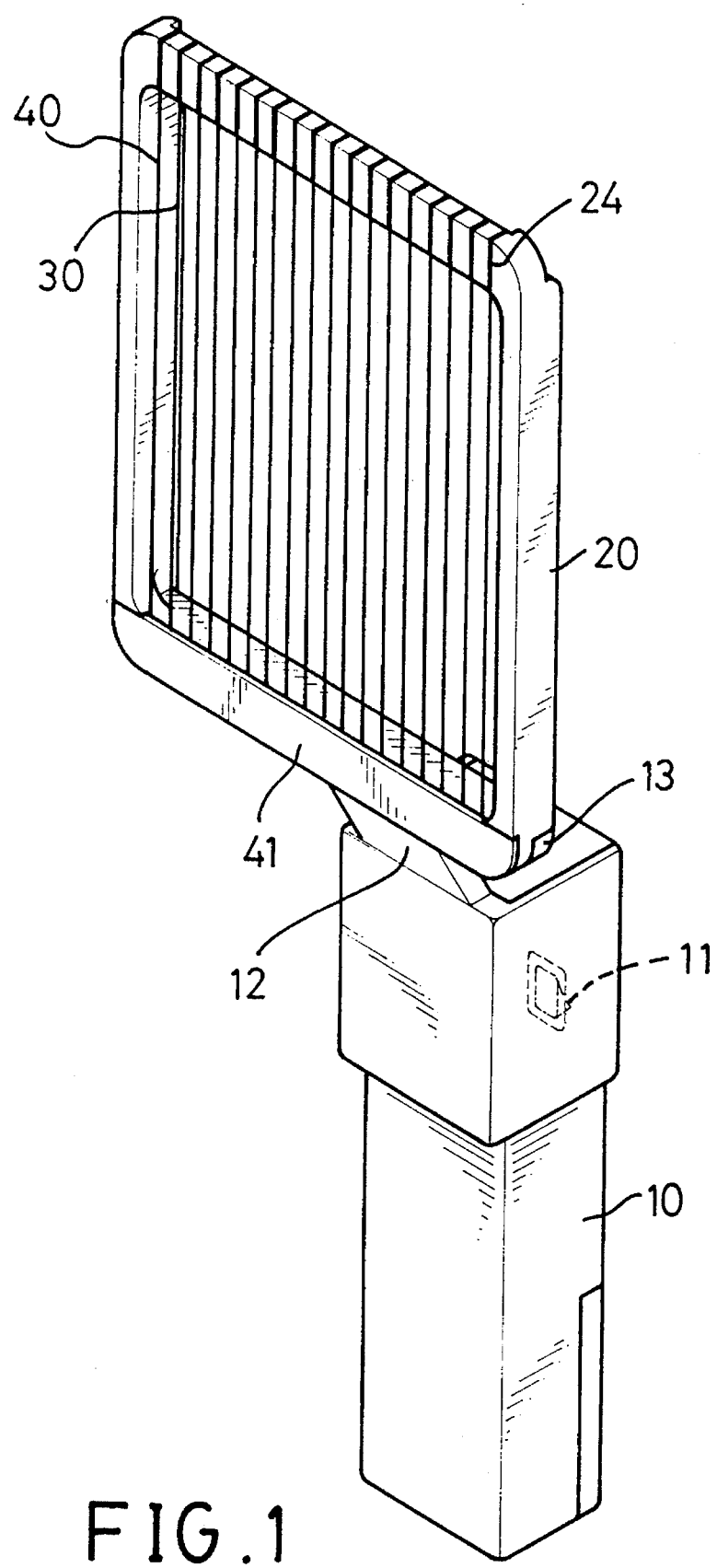
FIG. 1 is a perspective view of a portable electronic insect-killing device in accordance with the present invention.

Referring to FIGS. 1 and 4, a portable electronic insect-killing device in accordance with the present invention comprises a handle 10, a support frame 20, and a tube 12 connected between the handle 10 and the support frame 20. The handle 10 has an internal chamber 130 for receiving a relatively high voltage DC source (not shown), which is well known and is not described in more detail. It is well known that the DC source may be batteries connected in series. A positive line 50 and a negative line 60 extend from the high power source and provide a relatively high DC voltage therebetween.

The tube 12 is in communication with the chamber 130 of the handle 10 for guiding the positive line 50 and the negative line 60 from the handle 10 to the support frame 20. Moreover, the tube 12 is configured in such an inclined way that the support flame 20 and the handle 10 are not coplanar for easily catching insects which stay on a wall or the like.

The support frame 20 is an enclosure structure which may be circular, rectangular or the like. The support frame 20 is made of insulating material, such as wood or plastic, and has a first set of exposed conductive lines 30 and a second set of exposed conductive lines 40 disposed therein in parallel and respectively electronically connected to the positive line 50 and the negative line 60. Therefore, the first set of exposed conductive lines 30 are positively electrified and the second set of exposed conductive lines 40 are negatively electrified. The first set of exposed conductive lines 30 and the second set of exposed conductive lines 40 are alternately arranged line by line and spaced apart. The support frame 20 defines a plurality of recesses 24 around an upper edge thereof. Each recess is U shaped in cross-sectional view. Each of the conductive lines 30 and 40 is made of a relatively solid line and has a hook head for engaging on a corresponding recess 24 of the upper edge of the support frame 20.

Figure 2:
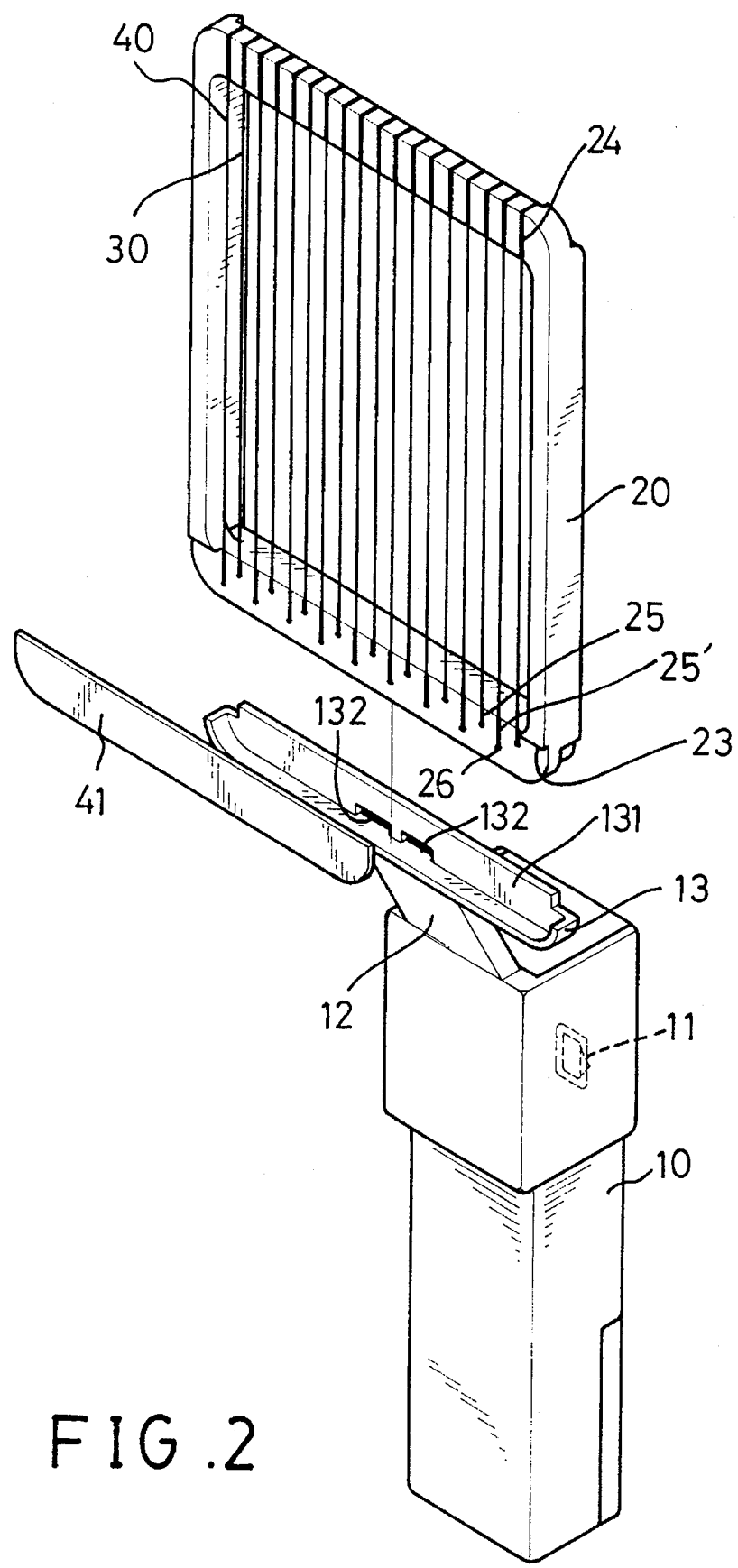
FIG. 2 is an exploded view of the device shown in FIG. 1 including a frame portion and a handle portion.

Referring to FIGS. 2 and 3, the support frame 20 defines a plurality of first grooves 25 and second grooves 25' at a lower edge thereof. Each groove 25 has a length greater than that of the groove 25'. Each of the first and second grooves 25, 25' is terminated with a hole 26 which is defined through the lower edge of the support frame 20. Each of the first conductive lines 30 has the hook end engaged within a corresponding groove 24 at the upper edge of the support frame 20 and a second end received in the first groove 25 and bent to pass through the hole 26. Each of the second conductive lines 40 has the hook end engaged on a corresponding groove 24 at the upper edge of the frame 20 and a second end received in the second groove 25' and bent to pass through the hole 26. Particularly referring to FIGS. 3 and 4, an upper lateral groove 27 and a lower lateral groove 28 are defined at a rear face of the lower edge of the support frame 20 and respectively receives the positive line 50 and the negative line 60 extended from the handle 10 through the tube 12 thereto. The second end of each first conductive line 30 is connected to the positive line 50 through a corresponding one of the holes 26. The second end of the second conductive lines 40 is connected to the negative line 60 through a corresponding one of the hole 26.

With the above configuration manner, each positively electrified line 30 is adjacent to two negative lines 40 on both sides thereof and vice versa. All the exposed conductive lines 30 and 40 form an electronic net to kill an insect by electronic shock upon the insect contacting therebetween, without disintegrating the insect and causing messy.

Further referring to FIG. 2, a transverse bracket 13 extended from the tube 12 defines two holes 132 for leading lines 50 and 60 from the tube 12. A wall 131 extended upward from the bracket 13 is used to engage the tube 12 to the support frame 20 at the lower edge thereof. A cover 41 is engaged to the lower edge of the support frame 20 to exactly cover the exposed line portion of the lines 30 and 40. A switch 11 is installed on the handle 10 allowing a user to turn on/off the power.

It is appreciated that the insect-killing device of the present invention can still work even when any of the first lines 30 or the second lines 40 is broken. It should be stressed that the lines 30 and 40 are very strong solid metal wires which are not easily bent to contact to an adjacent one even when it is broken. If any breakage occurs, it should be noted that the dangling portion of the broken line is still retained engaged on the upper edge of the frame 20 not in contact with adjacent wires while another portion thereof is still connected to the positive line 50 or the negative line 60 thus still functions substantially as normal. It should be stressed that the insect killing device of the present invention can kill insects such as ants in a wall corner by the lines 30 and 40 wound around the upper edge of the support frame 20.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A portable electronic insect-killing device comprising a handle, a support frame being made of insulating material, and a tube connecting said handle and said frame;

said handle having an internal chamber for receiving a relatively high power source from which a positive line of high voltage and a negative line extend, said positive line and said negative line being guided in said tube to said frame;

said frame having a first set of exposed conductive lines and a second set of exposed conductive lines disposed thereacross in a spaced, parallel and alternating relationship, said first set and said second set of lines being respectively electronically connected to said positive line and said negative line;

said first lines each including a first end independently engaged to an upper edge of said support frame and a second end engaged to a lower edge of said support frame yet connected to each other via a portion of said positive line;

said second lines each including a first end independently engaged to an upper edge of said support frame and a second end engaged to a lower edge of said support frame yet connected to each other via a portion of said negative line;

whereby said support frame defines a plurality of first grooves and second grooves with different lengths alternately defined on the lower edge thereof, each of said first grooves and second grooves terminated as a hole through said lower edge, each said first groove receiving a second end of a corresponding one of said first lines, each said second groove receiving a second end of a corresponding one of said second lines, each said hole allowing a second end of a corresponding one of said first and second lines to extend therethrough.

2. The portable electronic insect-killing device as claimed in claim 1, wherein said support frame defines a plurality of substantially U-shaped grooves around the upper edge thereof for receiving the first end of each said first line and second line.

3. The portable electronic insect-killing device as claimed in claim 1, wherein said support frame defines a first transverse groove and a second transverse groove at a face of said lower edge opposite to where the first grooves and the second grooves are defined, said first transverse groove and said second transverse groove being separated from each other and respectively receiving said positive line and said negative line.

4. A portable electronic insect-killing device as claimed in claim 1, wherein the tube connects the frame and the handle in such an inclined manner that the frame and the handle are not coplanar.

* * * * *